(12) United States Patent
Thomas et al.

(10) Patent No.: US 10,287,007 B2
(45) Date of Patent: May 14, 2019

(54) ROTORCRAFT AND ASSOCIATED ROTOR BLADE POSITION MONITORING SYSTEM AND METHOD

(71) Applicant: The Boeing Company, Chicago, IL (US)

(72) Inventors: Jeffrey M. Thomas, Gilbert, AZ (US); David Alderete, Mesa, AZ (US); Richard Costello, Chandler, AZ (US)

(73) Assignee: The Boeing Company, Chicago, IL (US)

( * ) Notice: Subject to any disclaimer, the term of this patent is extended or adjusted under 35 U.S.C. 154(b) by 721 days.

(21) Appl. No.: 15/000,179

(22) Filed: Jan. 19, 2016

(65) Prior Publication Data
US 2017/0203838 A1    Jul. 20, 2017

(51) Int. Cl.
| | |
|---|---|
| *B64C 27/39* | (2006.01) |
| *B64C 27/78* | (2006.01) |
| *B64C 27/00* | (2006.01) |
| *B64F 5/60* | (2017.01) |
| *B64F 5/00* | (2017.01) |
| *B64C 27/48* | (2006.01) |

(52) U.S. Cl.
CPC ............ *B64C 27/39* (2013.01); *B64C 27/008* (2013.01); *B64C 27/78* (2013.01); *B64F 5/60* (2017.01); *B64C 27/48* (2013.01)

(58) Field of Classification Search
CPC ....... B64C 27/008; B64C 27/37; B64C 27/39; B64C 27/41; B64C 27/43; B64C 27/45; B64C 27/48; B64C 27/59; B64C 27/635; B64C 27/78; B64D 2045/0085; B64F 5/60

USPC .......... 415/118, 140, 141; 416/9, 10, 12, 17, 416/18, 27, 31, 43, 98, 102, 103, 104, 416/131
See application file for complete search history.

(56) References Cited

U.S. PATENT DOCUMENTS

| | | | |
|---|---|---|---|
| 5,340,279 A | 8/1994 | Cycon et al. | |
| 2012/0257847 A1* | 10/2012 | Allred | B64C 27/35 384/221 |

(Continued)

FOREIGN PATENT DOCUMENTS

| | | |
|---|---|---|
| GB | 2116506 | 9/1983 |
| JP | 2002/137797 | 5/2002 |

(Continued)

OTHER PUBLICATIONS

European Patent Office, Extended European Search Report, EP 17 15 0619 (dated Jun. 7, 2017).

*Primary Examiner* — Justin D Seabe
*Assistant Examiner* — Alexander A White
(74) *Attorney, Agent, or Firm* — Walters & Wasylyna LLC (57) ABSTRACT

A rotorcraft including a rotor hub, a pitch housing moveable relative to the rotor hub about at least a feather axis and a flap axis, the pitch housing defining an internal volume, a bearing pin, the inboard end portion of the bearing pin being fixedly connected to the rotor hub, wherein the bearing pin defines the feather axis, a spherical bearing connected to the inboard end portion of the pitch housing and defining the flap axis, wherein the bearing pin extends through the spherical bearing, a rotor blade connected to the outboard end portion of the pitch housing, and a sensor assembly positioned in the internal volume and operatively connected to both the pitch housing and the outboard end portion of the bearing pin.

20 Claims, 6 Drawing Sheets

(56) References Cited

U.S. PATENT DOCUMENTS

| | | | | |
|---|---|---|---|---|
| 2013/0243597 A1* | 9/2013 | Perrin | B64C 27/008 | |
| | | | | 416/131 |
| 2014/0061369 A1* | 3/2014 | Schank | B64C 27/008 | |
| | | | | 244/17.13 |
| 2015/0210382 A1* | 7/2015 | Dempsey | B64C 27/57 | |
| | | | | 416/1 |
| 2015/0284077 A1* | 10/2015 | Loftus, Jr. | B64C 27/39 | |
| | | | | 416/103 |

FOREIGN PATENT DOCUMENTS

| | | |
|---|---|---|
| JP | 2005/238944 | 9/2005 |
| JP | 2010/149602 | 7/2010 |
| WO | 2015/191144 | 12/2015 |

\* cited by examiner

FIG. 6

ROTORCRAFT AND ASSOCIATED ROTOR BLADE POSITION MONITORING SYSTEM AND METHOD

FIELD

This application relates to rotorcraft and, more particularly, to monitoring the position (e.g., feather angle and/or flap angle) of the rotor blades of a rotorcraft.

BACKGROUND

Rotorcraft, such as helicopters, employ rotor blades to generate lift. Specifically, rotorcraft typically include a mast that is coupled to a power plant (e.g., a jet engine and transmission assembly), and the rotor blades are coupled to the mast by way of a rotor hub. Rotation of the mast about a mast axis causes corresponding rotation of the rotor blades about the mast axis, thereby generating lift.

To enhance control and stability, rotorcraft are often provided with articulatable rotor blades. One common mode of articulation, typically referred to as "flapping," involves pivoting a rotor blade relative to the rotor hub about a horizontal flap axis. Another common mode of articulation, typically referred to as "feathering," involves pitching a rotor blade relative to the rotor hub about a longitudinal feather axis. Other modes of articulation, such as lead-lag articulation, are also commonly used.

When flight testing a rotorcraft with articulatable rotor blades, it is often desirable to know the position of each rotor blade throughout the flight test, including the flap angle of each rotor blade and the feather angle of each rotor blade. Therefore, sensors have been installed on the exterior surface of the rotor hub to collect rotor blade position data. However, the installation of such sensors typically requires making unrepairable modifications (e.g., drilling and taping holes) to the rotor hub, and can be time consuming/expensive. Furthermore, being on the exterior surface of the rotor hub exposes the sensors to the elements, thereby requiring frequent repairs, and raises concerns about sensor components becoming disconnected from the rotor hub and coming into contact with sensitive components of the rotorcraft.

Accordingly, those skilled in the art continue with research and development efforts in the field of rotor blade position monitoring.

SUMMARY

In one embodiment, the disclosed rotorcraft may include a rotor hub, a pitch housing connected to the rotor hub and moveable relative to the rotor hub about at least a feather axis and a flap axis, the pitch housing defining an internal volume and including an inboard end portion and an outboard end portion, a bearing pin including an inboard end portion and an outboard end portion, the inboard end portion of the bearing pin being fixedly connected to the rotor hub, wherein the bearing pin defines the feather axis, a spherical bearing connected to the inboard end portion of the pitch housing and defining the flap axis, wherein the bearing pin extends through the spherical bearing, a rotor blade connected to the outboard end portion of the pitch housing, and a sensor assembly positioned, at least partially, in the internal volume and operatively connected to both the pitch housing and the outboard end portion of the bearing pin, the sensor assembly including a first position sensor configured to sense angular displacement of the pitch housing relative to the rotor hub about the flap axis and a second position sensor configured to sense angular displacement of the pitch housing relative to the rotor hub about the feather axis.

In another embodiment, the disclosed rotorcraft may include a rotor hub, a pitch housing connected to the rotor hub and moveable relative to the rotor hub about at least a feather axis and a flap axis, the pitch housing defining an internal volume and including an inboard end portion and an outboard end portion, a bearing pin including an inboard end portion and an outboard end portion, the inboard end portion of the bearing pin being fixedly connected to the rotor hub, wherein the bearing pin defines the feather axis, a spherical bearing connected to the inboard end portion of the pitch housing and defining the flap axis, wherein the bearing pin extends through the spherical bearing such that the outboard end portion of the bearing pin protrudes from the spherical bearing toward the internal volume, a rotor blade connected to the outboard end portion of the pitch housing, and a sensor assembly positioned, at least partially, in the internal volume and operatively connected to both the pitch housing and the outboard end portion of the bearing pin, the sensor assembly including a first potentiometer, a first lever member pivotally connected to the first potentiometer about a first axis of rotation, wherein the first lever member pivots about the first axis of rotation in response to angular displacement of the pitch housing relative to the rotor hub about the flap axis, a second potentiometer, and a second lever member pivotally connected to the second potentiometer about a second axis of rotation, wherein the second lever member pivots about the second axis of rotation in response to angular displacement of the pitch housing relative to the rotor hub about the feather axis.

Other embodiments of the disclosed rotorcraft and associated rotor blade position monitoring system and method will become apparent from the following detailed description, the accompanying drawings and the appended claims.

DETAILED DESCRIPTION

Disclosed is a rotorcraft that includes a sensor assembly configured to sense angular displacement of a pitch housing (and associated rotor blade) relative to a rotor hub about a flap axis and/or angular displacement of the pitch housing (and associated rotor blade) relative to the rotor hub about a feather axis. As used herein, "rotorcraft" refers to any heavier-than-air aircraft that employs rotor blades rotating about a mast axis to generate and sustain lift. Therefore, the disclosed rotorcraft may be a helicopter, a tilt-rotor aircraft, a cyclogyro or the like.

Figure 1:
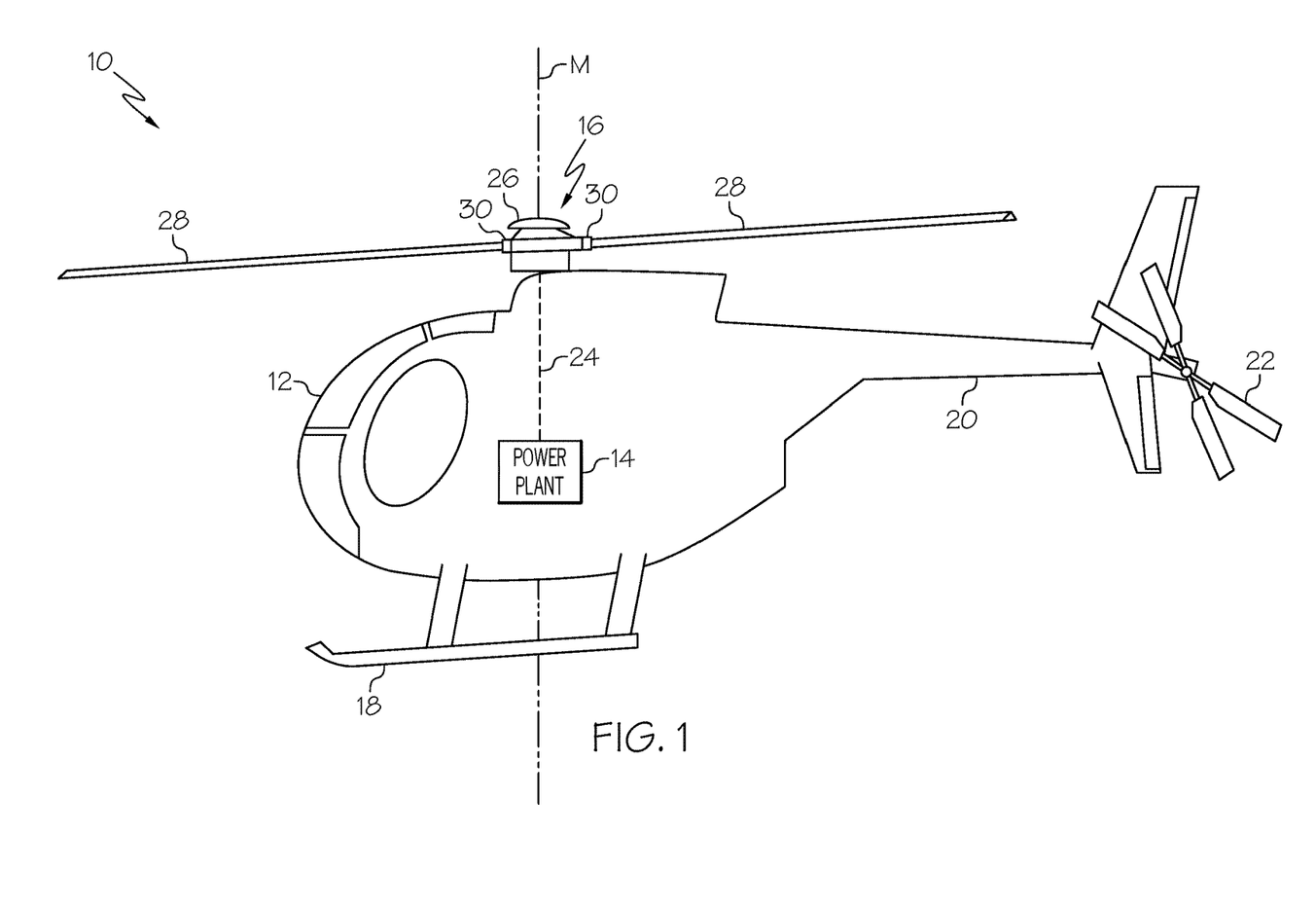
FIG. 1 is a side elevational view of one embodiment of the disclosed rotorcraft.

Referring to FIG. 1, one embodiment of the disclosed rotorcraft, generally designated 10, may include a fuselage 12, at least one power plant 14 and at least one rotor assembly 16. The rotorcraft 10 may include various additional features/structures, such as landing gear 18, a tail boom 20 and a tail rotor 22, without departing from the scope of the present disclosure.

The rotor assembly 16 of the disclosed rotorcraft 10 may include a mast 24, a rotor hub 26, two or more rotor blades 28 (e.g., six rotor blades 28) and two or more pitch housings 30 (e.g., six pitch housings 30). Each pitch housing 30 may be associated with a corresponding rotor blade 28. Specifically, each pitch housing 30 may be disposed between the rotor hub 26 and a corresponding rotor blade 28, thereby facilitating the connection between the rotor hub 26 and each rotor blade 28, while also facilitating articulation of each rotor blade 28 relative to the rotor hub 26.

The power plant 14 may supply rotational power to the mast 24, thereby causing the mast 24 to rotate about a mast axis M. For example, the power plant 14 may include an engine, such as a jet engine, an internal combustion engine or the like, and a transmission assembly. Rotation of the mast 24 about the mast axis M may cause corresponding rotation of the rotor blades 28 about the mast axis M, thereby generating lift.

Figure 2:
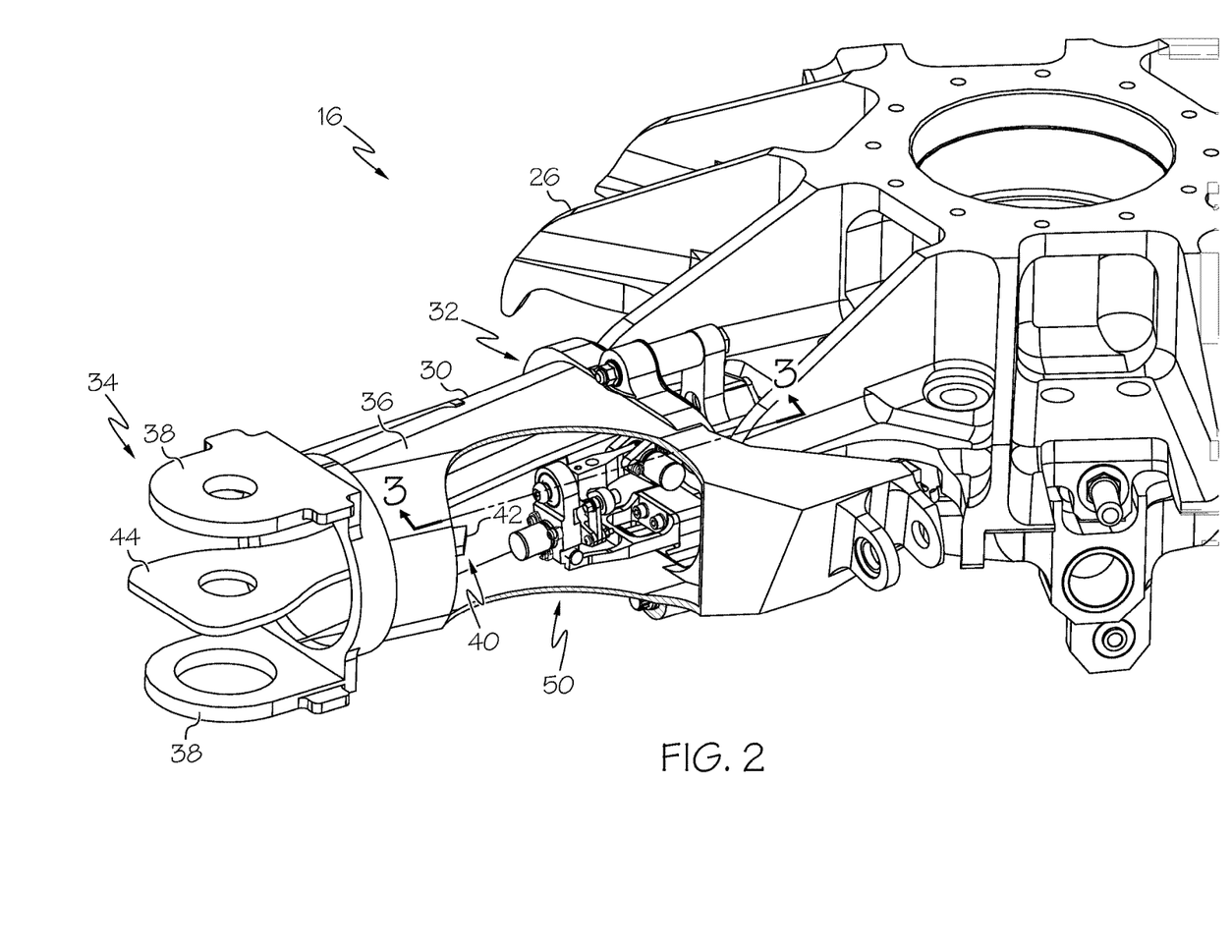
FIG. 2 is a perspective view of a portion of the rotor assembly of the rotorcraft of FIG. 1, shown with a partial cut-away.

Referring to FIG. 2, each pitch housing 30 of the rotor assembly 16 (only one pitch housing 30 is shown in FIG. 2) may include an inboard end portion 32, an outboard end portion 34 and a central body portion 36. The inboard end portion 32 of the pitch housing 30 may be connected to the rotor hub 26. The outboard end portion 34 of the pitch housing 30 may include mounting features 38 that facilitate connecting a rotor blade 28 (FIG. 1) to the outboard end portion 34 of the pitch housing 30.

The central body portion 36 of the pitch housing 30 may extend from the inboard end portion 32 of the pitch housing 30 to the outboard end portion 34 of the pitch housing 30, and may define an internal volume 40. A strap pack 42 may extend through the internal volume 40 of the pitch housing 30 such that an outboard end portion 44 of the strap pack 42 may be positioned to connect to a rotor blade 28 (FIG. 1) connected to the outboard end portion 34 of the pitch housing 30. A sensor assembly 50, described in greater detail herein, may be housed, at least partially, within the internal volume 40 of the pitch housing 30.

Figure 3:
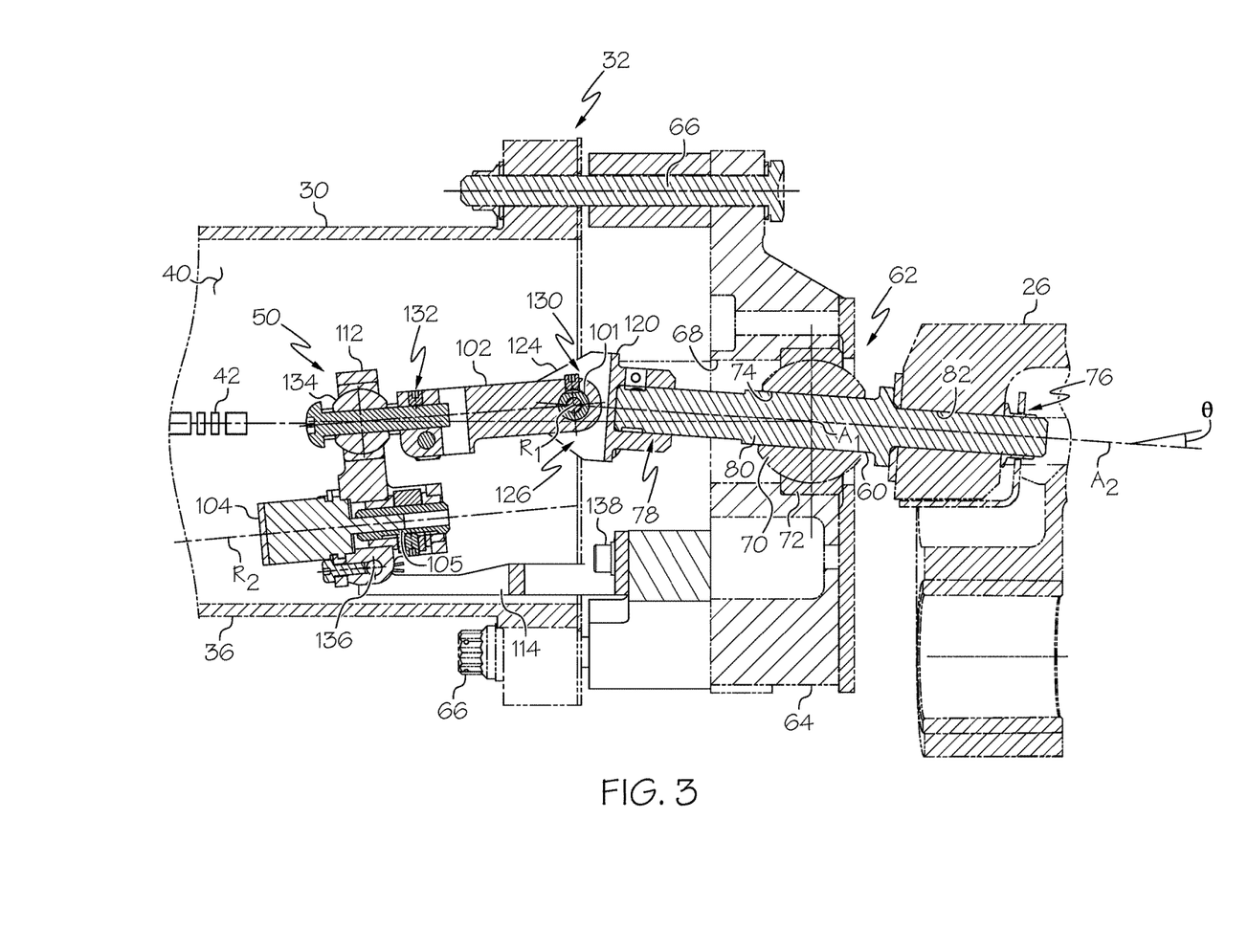
FIG. 3 a side sectional view of a portion of the rotor assembly of FIG. 2.

Referring to FIG. 3, the inboard end portion 32 of the pitch housing 30 may be connected to the rotor hub 26 by way of a bearing pin 60 engaged with a spherical bearing 62. The spherical bearing 62 may define a flap axis $A_1$ (perpendicular to the page in FIG. 3) and the bearing pin 60 may define a feather axis $A_2$. Therefore, the pitch housing 30 may be articulatable relative to the rotor hub 26 about the flap axis $A_1$ (flapping) and the feather axis $A_2$ (feathering).

In the illustrated example, a bearing housing assembly 64 may be connected to (or integral with) the inboard end portion 32 of the pitch housing 30. Therefore, the internal volume 40 defined by the pitch housing 30 may partially extend into the bearing housing assembly 64. The connection between the bearing housing assembly 64 and the pitch housing 30 may be made with mechanical fasteners 66, such as screws, bolts, rivets or the like, though other connection techniques (e.g., an integral connection or a welded connection) are also contemplated. The bearing housing assembly 64 may define a bore 68, and the spherical bearing 62 may be positioned within the bore 68 of the bearing housing assembly 64.

The spherical bearing 62 may include a spherical member 70 and a socket member 72. The socket member 72 of the spherical bearing 62 may be fixedly connected to the bore 68 of the bearing housing assembly 64. The spherical member 70 of the spherical bearing 62 may be seated in the socket member 72, and may be rotatable relative to the socket member 72 about the flap axis $A_1$ and the feather axis $A_2$. The spherical member 70 of the spherical bearing 62 may define a bore 74 extending therethrough.

Still referring to FIG. 3, the bearing pin 60 may be elongated along the feather axis $A_2$, and may include an inboard end portion 76, an outboard end portion 78 longitudinally opposed from the inboard end portion 76, and a central portion 80 between the inboard end portion 76 and the outboard end portion 78. The inboard end portion 76 of the bearing pin 60 may be fixedly connected to the rotor hub 26 such that the bearing pin 60 does not move relative to the rotor hub 26 either along or about the feather axis $A_2$. For example, the rotor hub 26 may define a bore 82 and the inboard end portion 76 of the bearing pin 60 may be received in the bore 82. The bore 82 and the inboard end portion 76 of the bearing pin 60 may have a hex-shaped cross-sectional profile (or other torque transferring profile) such that the bearing pin 60 does not rotate relative to the bore 82 about the feather axis $A_2$.

The bearing pin 60 may protrude from the rotor hub 26 and through the spherical bearing 62 such that the outboard end portion 78 of the bearing pin 60 protrudes from the spherical bearing 62 toward the internal volume 40 of the pitch housing 30. For example, the bearing pin 60 may extend through the bore 74 defined in the spherical member 70 of the spherical bearing 62 such that the spherical member 70 is received over (and fixedly connected to) the central portion 80 of the bearing pin 60. The outboard end portion 78 of the bearing pin 60 may protrude from the spherical bearing 62 toward the internal volume 40 of the pitch housing 30.

Thus, the bearing pin 60 and the spherical bearing 62 may facilitate rotation of the pitch housing 30 relative to the rotor hub 26 about both the flap axis $A_1$ (a flapping motion) and the feather axis $A_2$ (a feathering motion). Specifically, the bearing pin 60 and the spherical member 70 of the spherical bearing 62 may remain fixedly connected to the rotor hub 26, while the pitch housing 30 moves about both the flap axis $A_1$ and the feather axis $A_2$ by way of the socket member 72 of the spherical bearing 62.

The sensor assembly 50 of the disclosed rotorcraft 10 (FIG. 1) may be connected to the outboard end portion 78 of the bearing pin 60. The sensor assembly 50 may also be connected to the pitch housing 30 (e.g., by way of the bearing housing assembly 64). Therefore, the sensor assembly 50 may sense movement of the pitch housing 30 relative to the bearing pin 60 and, thus, the rotor hub 26 about both the flap axis $A_1$ and the feather axis $A_2$. Because the outboard end portion 78 of the bearing pin 60 extends toward the internal volume 40 of the pitch housing 30, the sensor assembly 50 may be contained, at least partially, within the internal volume 40 of the pitch housing 30.

Figure 4:
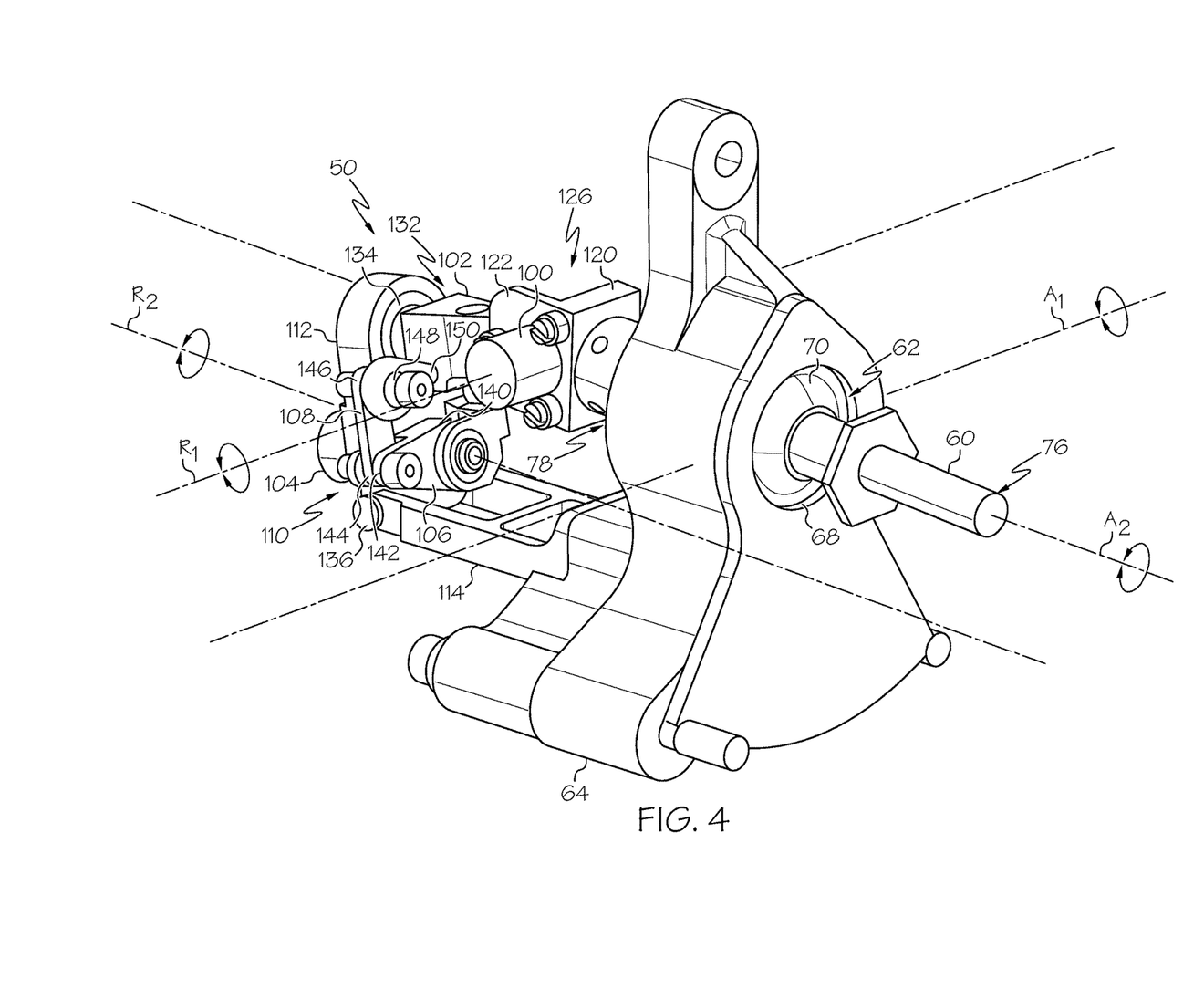
FIG. 4 is a side and outboard view of a portion of the portion of the rotor assembly shown in FIG. 2.
Figure 5:
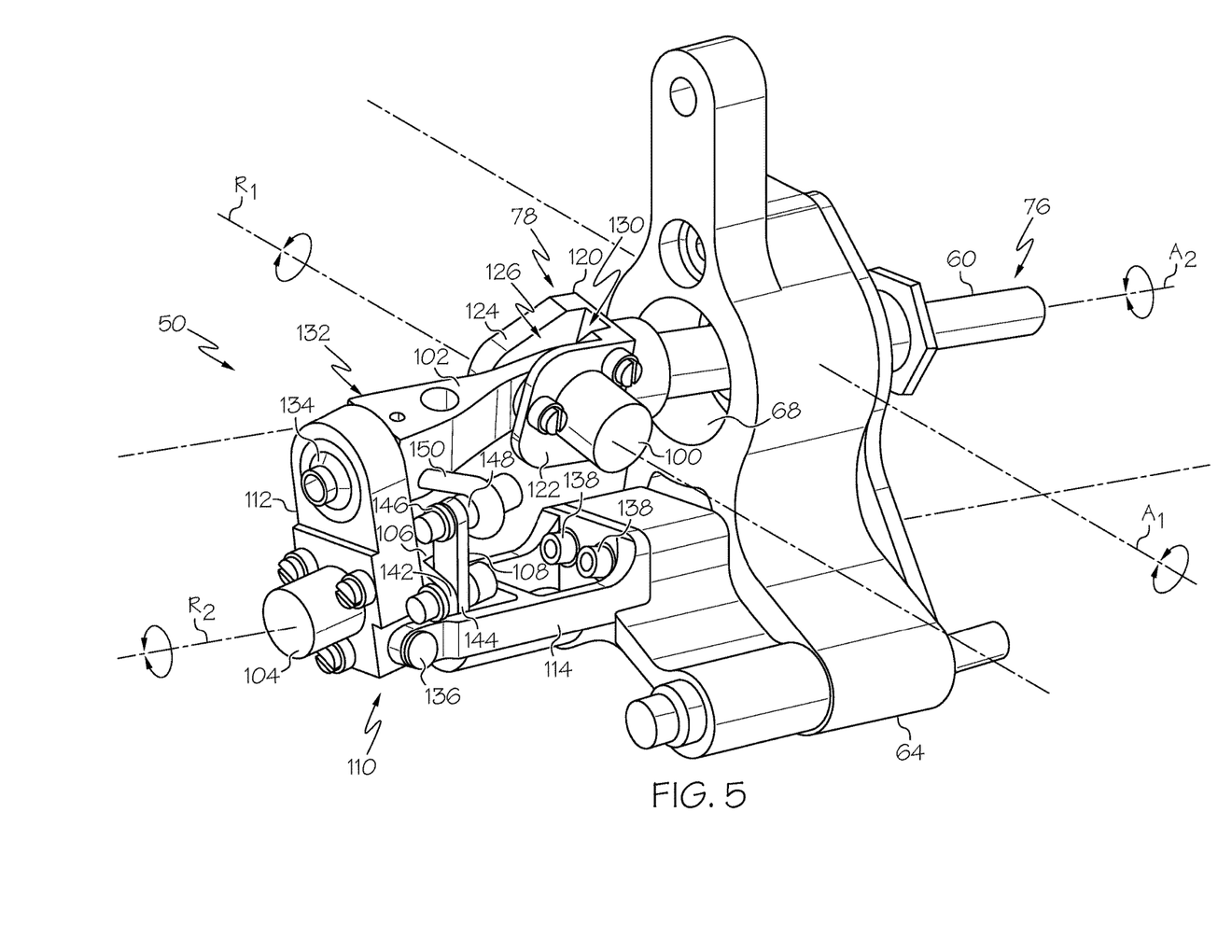
FIG. 5 is a side and inboard view of the portion of the rotor assembly shown in FIG. 4.
Figure 6:
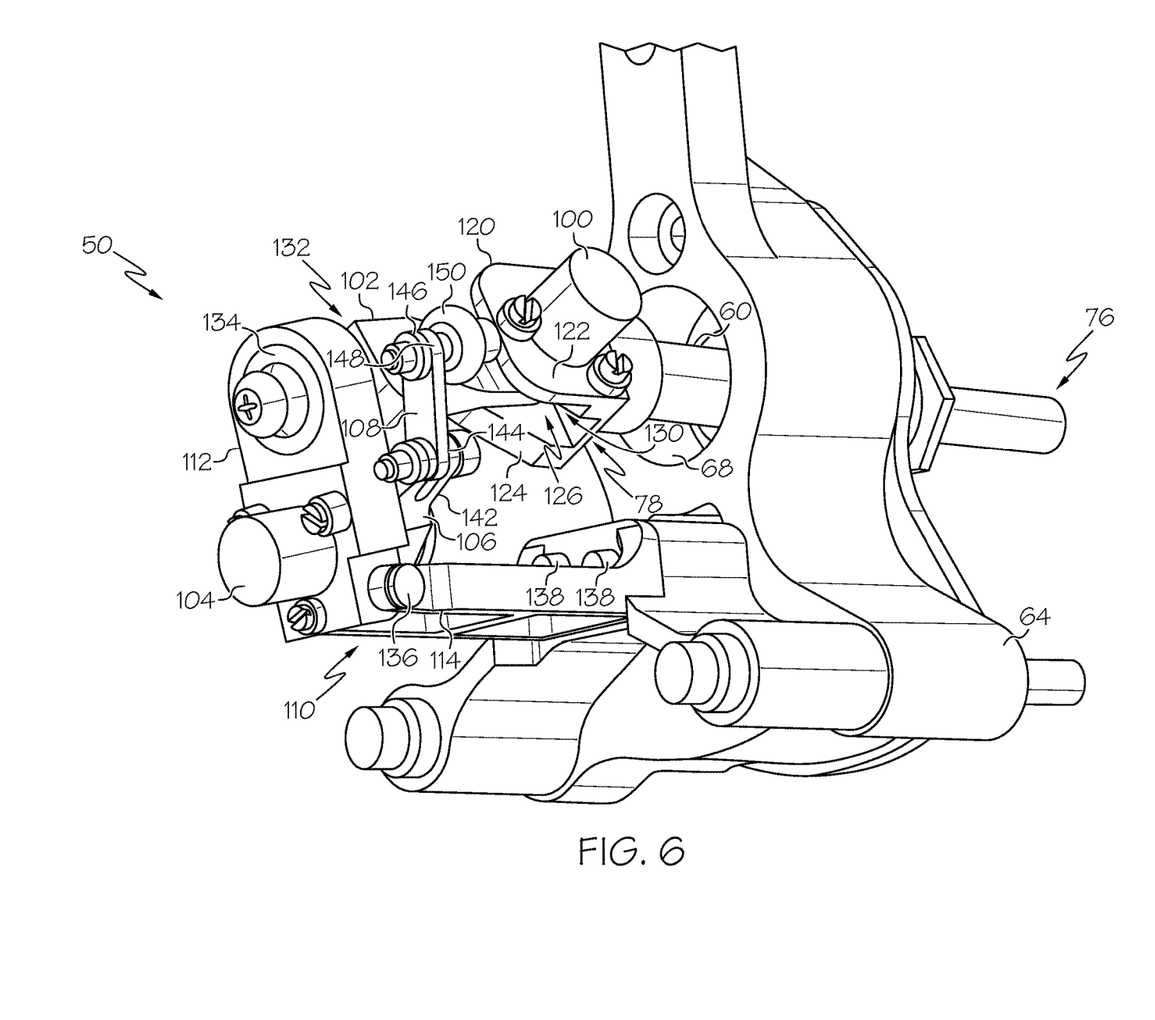
FIG. 6 is a side and inboard view of the portion of the rotor assembly shown in FIG. 5, but at a different feather angle.

Referring now to FIGS. 4-6, in one particular construction, the sensor assembly 50 may include a first position sensor 100, a first lever member 102, a second position sensor 104, a second lever member 106 and a link member 108. The sensor assembly 50 may further include a support structure 110, which may include a support member 112 and a tie member 114. Various additional components may be included in the sensor assembly 50 without departing from the scope of the present disclosure.

The first position sensor 100 of the sensor assembly 50 may be fixedly connected to the outboard end portion 78 of the bearing pin 60, and may define a first axis of rotation $R_1$ (FIGS. 4 and 5). The first axis of rotation $R_1$ may be substantially parallel with the flap axis $A_1$. Therefore, movement about the first axis of rotation $R_1$, as detected by the first position sensor 100, may be indicative of the angular displacement of the pitch housing 30 (FIGS. 2 and 3) relative to the bearing pin 60—and, thus, the rotor hub 26 (FIGS. 2 and 3)—about the flap axis $A_1$.

The first position sensor 100 may be fixedly connected to the outboard end portion 78 of the bearing pin 60 by way of a clevis 120. Specifically, the clevis 120 may be fixedly connected to the outboard end portion 78 of the bearing pin 60, and may include a first fork portion 122 and a second fork portion 124 laterally spaced from the first fork portion 122. Therefore, a gap 126 may be defined between the first and second fork portions 122, 124. The first position sensor 100 may be fixedly connected to the first fork portion 122 of the clevis 120.

The first lever member 102 may include a first end portion 130 and a second end portion 132. The first end portion 130 of the first lever member 102 may extend into the gap 126 of the clevis 120, and may be connected to the first position sensor 100 such that the first lever member 102 pivots relative to the first position sensor 100 about the first axis of rotation $R_1$. Therefore, the first position sensor 100 may sense pivoting movement of the first lever member 102 about the first axis of rotation $R_1$.

The second end portion 132 of the first lever member 102 may be operatively connected to the pitch housing 30 (FIGS. 2 and 3), such as by way of the support structure 110 and the bearing housing assembly 64. For example, the second end portion 132 of the first lever member 102 may be connected to the support member 112 of the support structure 110 by way of a spherical bearing 134, the support structure 110 may be hingedly connected to the tie member 114 of the support structure 110 by way of a hinge pin 136, the tie member 114 may be fixedly connected to the bearing housing assembly 64 by way of mechanical fasteners 138 (FIGS. 5 and 6), such as screws, bolts, rivets or the like, and, as best shown in FIG. 3, the bearing housing assembly 64 may be connected to the pitch housing 30 by way of mechanical fasteners 66.

Thus, angular displacement of the pitch housing 30 (FIGS. 2 and 3) relative to the bearing pin 60—and, thus, the rotor hub 26 (FIGS. 2 and 3)—about the flap axis $A_1$ may cause corresponding pivoting movement of the first lever member 102 about the first axis of rotation $R_1$. Such pivoting movement of the first lever member 102 about the first axis of rotation $R_1$ may be detected by the first position sensor 100 and may be indicative of the angular displacement of the pitch housing 30 relative to the rotor hub 26 about the flap axis $A_1$.

The first position sensor 100 may be any rotary position sensor capable of detecting the motion of the first lever member 102 about the first axis of rotation $R_1$ and generating (or facilitating the generation of) an electronic signal (e.g., a voltage signal) indicative of such motion. As one specific non-limiting example, the first position sensor 100 may be (or may include) a potentiometer. The potentiometer-type first position sensor 100 may include a shaft 101 (FIG. 3) that rotates about the first axis of rotation $R_1$. Therefore, the first end portion 130 of the first lever member 102 may be fixedly connected to the rotating shaft 101 of the potentiometer (first position sensor 100) such that pivoting movement of the first lever member 102 about the first axis of rotation $R_1$ causes corresponding rotation of the shaft 101 about the first axis of rotation $R_1$.

Still referring to FIGS. 4-6, the second position sensor 104 of the sensor assembly 50 may be operatively connected to the pitch housing 30 (FIGS. 2 and 3). For example, the second position sensor 104 may be mounted on the support member 112 of the support structure 110, and the support member 112 may be connected to the pitch housing 30 by way of the tie member 114 and the bearing housing assembly 64. Therefore, the second position sensor 104 may move with the pitch housing 30 as the pitch housing 30 moves relative to the bearing pin 60 (and the rotor hub 26) about both the flap axis $A_1$ and the feather axis $A_2$.

The second position sensor 104 may define a second axis of rotation $R_2$ (FIGS. 3-5). The second axis of rotation $R_2$ may be generally aligned with the feather axis $A_2$, but the angle therebetween may vary depending on the orientation of the pitch housing 30 relative to the rotor hub 26. Therefore, movement about the second axis of rotation $R_2$, as detected by the second position sensor 104, may be indicative of the angular displacement of the pitch housing 30 (FIGS. 2 and 3) relative to the bearing pin 60—and, thus, the rotor hub 26 (FIGS. 2 and 3)—about the feather axis $A_2$.

As best shown in FIG. 3, while the second axis of rotation $R_2$ may be generally aligned with the feather axis $A_2$, the angle therebetween may be non-zero. In one expression, the angle $\Theta$ between the second axis of rotation $R_2$ and the feather axis $A_2$ may range from about 0 degrees to about 25 degrees, depending on the orientation of the pitch housing 30 (FIGS. 2 and 3) relative to the rotor hub 26 (FIGS. 2 and 3). In another expression, the angle $\Theta$ between the second axis of rotation $R_2$ and the feather axis $A_2$ may range from about 0 degrees to about 20 degrees, depending on the orientation of the pitch housing 30 relative to the rotor hub 26. In yet another expression, the angle $\Theta$ between the second axis of rotation $R_2$ and the feather axis $A_2$ may range from about 0 degrees to about 15 degrees, depending on the orientation of the pitch housing 30 relative to the rotor hub 26.

Referring back to FIGS. 4-6, the second lever member 106 may include a first end portion 140 (FIG. 4) and a second end portion 142. The first end portion 140 of the second lever member 106 may be connected to the second position sensor 104 such that the second lever member 106 pivots relative to the second position sensor 104 about the second axis of rotation $R_2$. Therefore, the second position sensor 104 may sense pivoting movement of the second lever member 106 about the second axis of rotation $R_2$.

The second end portion 142 of the second lever member 106 may be operatively connected to the bearing pin 60 by way of the link member 108. For example, the first end portion 144 of the link member 108 may be hingedly connected to the second end portion 142 of the second lever member 106, while the second end portion 146 of the link member 108 may be connected to the first lever member 102 by way of a spherical bearing 148 and a bracket 150. As disclosed herein, the first lever member 102 is hingedly connected to the outboard end portion 78 of the bearing pin 60 by way of the clevis 120, and does not rotated about the feather axis $A_2$.

Thus, angular displacement of the pitch housing 30 (FIGS. 2 and 3) relative to the bearing pin 60—and, thus, the rotor hub 26 (FIGS. 2 and 3)—about the feather axis $A_2$ may cause corresponding pivoting movement of the second lever member 106 about the second axis of rotation $R_2$. Such pivoting movement of the second lever member 106 about the second axis of rotation $R_2$ may be detected by the second position sensor 104 and may be indicative of the angular displacement of the pitch housing 30 relative to the rotor hub 26 about the feather axis $A_2$.

The second position sensor 104 may be any rotary position sensor capable of detecting the motion of the second lever member 106 about the second axis of rotation $R_2$ and generating (or facilitating the generation of) an electronic signal (e.g., a voltage signal) indicative of such motion. As one specific non-limiting example, the second position sensor 104 may be (or may include) a potentiometer. The potentiometer-type second position sensor 104 may include a shaft 105 (FIG. 3) that rotates about the second axis of rotation $R_2$. Therefore, the first end portion 140 of the second lever member 106 may be fixedly connected to the rotating shaft 105 of the potentiometer (second position sensor 104) such that pivoting movement of the second lever member 106 about the second axis of rotation $R_2$ causes corresponding rotation of the shaft 105 about the second axis of rotation $R_2$.

Accordingly, the disclosed sensor assembly 50 employs a first lever member 102 disposed between the pitch housing 30 and the outboard end portion 78 of the bearing pin 60 of a rotorcraft 10 to actuate the first position sensor 100 is response to flapping of the pitch housing 30 relative to the bearing pin 60, and a second lever member 106 also disposed between the pitch housing 30 and the outboard end portion 78 of the bearing pin 60 to actuate the second position sensor 104 is response to feathering of the pitch housing 30 relative to the bearing pin 60. Significantly, by extending the outboard end portion 78 of the bearing pin 60 toward/into the internal volume 40 of the pitch housing 30, the sensor assembly 50 may be contained, at least partially, within the internal volume 40 of a pitch housing 30, thereby eliminating the concern associated with sensor components becoming disconnected from the rotor hub, per prior art designs.

At this point, those skilled in the art will appreciate that existing rotorcraft may be retrofitted to employ the disclosed sensor assembly 50. For example, an existing rotorcraft may be retrofitted by swapping an existing bearing pin for a longer bearing pin 60, specifically a bearing pin 60 that protrudes from the spherical bearing 62 toward the internal volume 40 of the pitch housing 30, and then connecting the sensor assembly 50 to the outboard end portion 78 of the bearing pin 60 and the pitch housing 30, as disclosed herein.

Although various embodiments of the disclosed rotorcraft and associated rotor blade position monitoring system and method have been shown and described, modifications may occur to those skilled in the art upon reading the specification. The present application includes such modifications and is limited only by the scope of the claims.

What is claimed is:

1. A rotorcraft comprising:
a rotor hub;
a pitch housing connected to said rotor hub and moveable relative to said rotor hub about at least a feather axis and a flap axis, said pitch housing defining an internal volume and comprising an inboard end portion and an outboard end portion;
a bearing pin comprising an inboard end portion and an outboard end portion, said inboard end portion of said bearing pin being fixedly connected to said rotor hub, wherein said bearing pin defines said feather axis;
a spherical bearing connected to said inboard end portion of said pitch housing and defining said flap axis, wherein said bearing pin extends through said spherical bearing;
a rotor blade connected to said outboard end portion of said pitch housing; and
a sensor assembly positioned, at least partially, in said internal volume and operatively connected to both said pitch housing and said outboard end portion of said bearing pin, said sensor assembly comprising:
a first position sensor configured to sense angular displacement of said pitch housing relative to said rotor hub about said flap axis; and
a second position sensor configured to sense angular displacement of said pitch housing relative to said rotor hub about said feather axis.

2. The rotorcraft of claim 1 further comprising a mast, wherein said rotor hub is connected to said mast.

3. The rotorcraft of claim 1 further comprising a strap pack connecting said rotor blade to said rotor hub, wherein a portion of said strap pack is received in said internal volume.

4. The rotorcraft of claim 1 further comprising a bearing housing assembly connected to said inboard end portion of said pitch housing, wherein said bearing housing assembly defines a bore and said spherical bearing is received in said bore.

5. The rotorcraft of claim 1 wherein said spherical bearing comprising a spherical member and a socket member, said spherical member defining a bore, and wherein said bearing pin is connected to said spherical member and extends through said bore defined by said spherical member.

6. The rotorcraft of claim 1 wherein at least one of said first position sensor and said second position sensor comprises a potentiometer.

7. The rotorcraft of claim 1 wherein said sensor assembly further comprises a first lever member pivotally connected to said first position sensor about a first axis of rotation.

8. The rotorcraft of claim 7 wherein said first lever member pivots about said first axis of rotation in response to angular displacement of said pitch housing relative to said rotor hub about said flap axis.

9. The rotorcraft of claim 7 wherein said first axis of rotation is substantially parallel with said flap axis.

10. The rotorcraft of claim 7 wherein said sensor assembly further comprises a second lever member pivotally connected to said second position sensor about a second axis of rotation.

11. The rotorcraft of claim 10 wherein an angle between said second axis of rotation and said feather axis ranges from 0 degrees to at most 25 degrees.

12. The rotorcraft of claim 10 wherein said second lever member pivots about said second axis of rotation in response to angular displacement of said pitch housing relative to said rotor hub about said feather axis.

13. The rotorcraft of claim 10 wherein said second lever member comprises a first end portion and an opposed second end portion, wherein said first end portion is pivotally connected to said second position sensor about said second axis of rotation, and wherein said second end portion is operatively connected to said first lever member.

14. The rotorcraft of claim 13 wherein said operative connection between said second end portion of said second lever member and said first lever member comprises a link member and a second spherical bearing, and wherein said second spherical bearing is disposed between said link member and said first lever member.

15. The rotorcraft of claim 10 wherein said sensor assembly further comprises a support member connected to said pitch housing by way of a tie member, wherein said second position sensor is mounted on said support member.

16. The rotorcraft of claim 15 wherein said tie member is hingedly connected to said support member.

17. The rotorcraft of claim 16 wherein said support member is connected to said bearing pin by way of said first lever member.

18. The rotorcraft of claim 17 further comprising a spherical bearing disposed between said first lever member and said support member.

19. The rotorcraft of claim 1 wherein said first position sensor is fixedly connected to said outboard end portion of said bearing pin.

20. A rotorcraft comprising:
a rotor hub;
a pitch housing connected to said rotor hub and moveable relative to said rotor hub about at least a feather axis and a flap axis, said pitch housing defining an internal volume and comprising an inboard end portion and an outboard end portion;
a bearing pin comprising an inboard end portion and an outboard end portion, said inboard end portion of said bearing pin being fixedly connected to said rotor hub, wherein said bearing pin defines said feather axis;
a spherical bearing connected to said inboard end portion of said pitch housing and defining said flap axis, wherein said bearing pin extends through said spherical bearing such that said outboard end portion of said bearing pin protrudes from said spherical bearing toward said internal volume;
a rotor blade connected to said outboard end portion of said pitch housing; and
a sensor assembly positioned, at least partially, in said internal volume and operatively connected to both said pitch housing and said outboard end portion of said bearing pin, said sensor assembly comprising:
a first potentiometer;
a first lever member pivotally connected to said first potentiometer about a first axis of rotation, wherein said first lever member pivots about said first axis of rotation in response to angular displacement of said pitch housing relative to said rotor hub about said flap axis;
a second potentiometer; and
a second lever member pivotally connected to said second potentiometer about a second axis of rotation, wherein said second lever member pivots about said second axis of rotation in response to angular displacement of said pitch housing relative to said rotor hub about said feather axis.

* * * * *